United States Patent [19]

Nagashima

[11] Patent Number: 4,970,652
[45] Date of Patent: Nov. 13, 1990

[54] SYSTEM AND METHOD FOR DISPLAYING PRESENT POSITION FOR MOVING OBJECT

[75] Inventor: Yoshimasa Nagashima, Kanagawa, Japan

[73] Assignee: Nissan Motor Company, Ltd., Japan

[21] Appl. No.: 366,995

[22] Filed: Jun. 16, 1989

[30] Foreign Application Priority Data

Jun. 16, 1988 [JP] Japan .................. 63-149007

[51] Int. Cl.⁵ .................................. G06F 15/50
[52] U.S. Cl. .................................. 364/449; 340/995; 364/424.01
[58] Field of Search .............. 364/449, 443, 424.01; 340/990, 995; 342/64; 382/48, 49

[56] References Cited

U.S. PATENT DOCUMENTS

| | | | |
|---|---|---|---|
| 4,442,609 | 4/1984 | Senoo | 33/356 |
| 4,663,629 | 5/1987 | Tagami et al. | 364/449 X |
| 4,677,562 | 6/1987 | Uota et al. | 364/449 |
| 4,699,507 | 10/1987 | Etoh | 356/5 |
| 4,774,672 | 9/1988 | Tsunoda et al. | 364/449 |
| 4,878,170 | 10/1989 | Zeevi | 369/499 |
| 4,879,658 | 11/1989 | Takashima et al. | 340/995 X |

FOREIGN PATENT DOCUMENTS 58-223016 12/1983 Japan .

Primary Examiner—Thomas G. Black
Attorney, Agent, or Firm—Lowe, Price, LeBlanc, Becker & Shur

[57] ABSTRACT

A system and method for displaying a present position of a moving object on a road are disclosed in which a road map information surrounding the present position of the moving object is displayed together with the present position of the moving object and the present position of the vehicle which is derived on the basis of output signals of a running distance sensor and running direction sensor is automatically corrected through a pattern recognition between a form of a road on which the vehicle has travelled and a form of a running locus of the moving object.

22 Claims, 20 Drawing Sheets

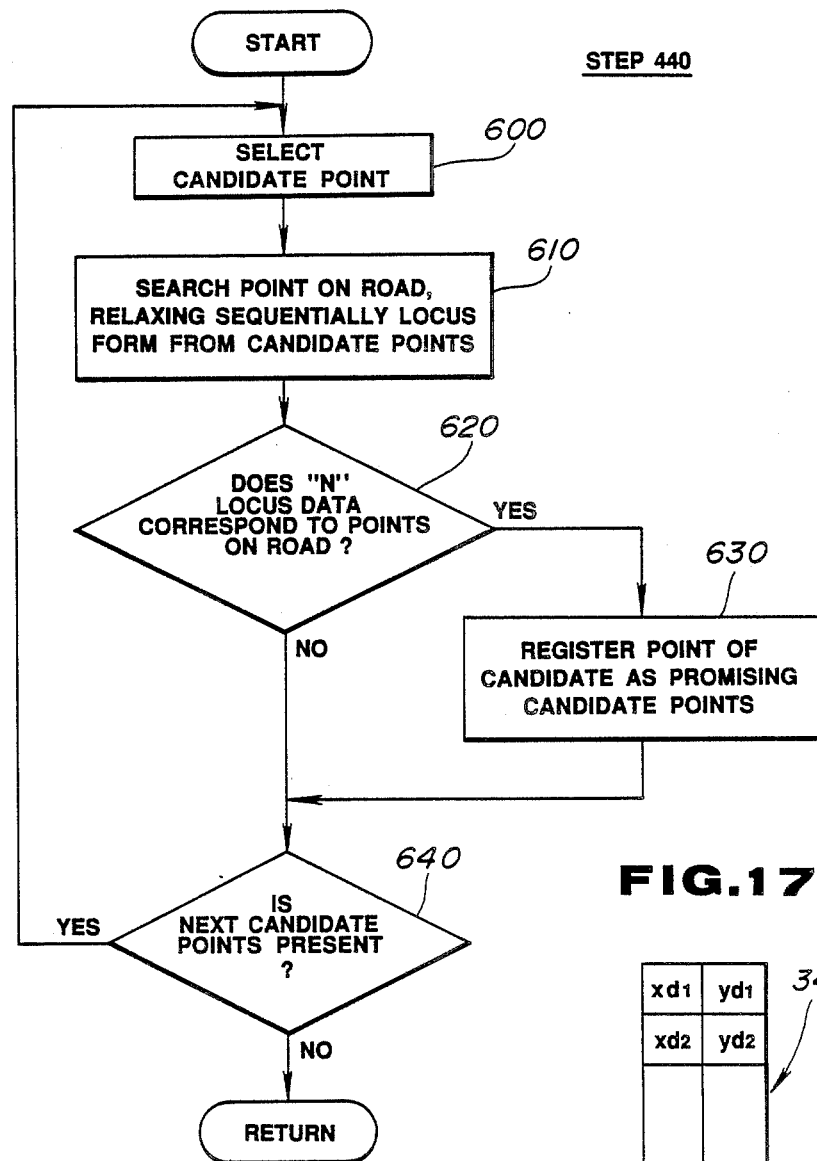

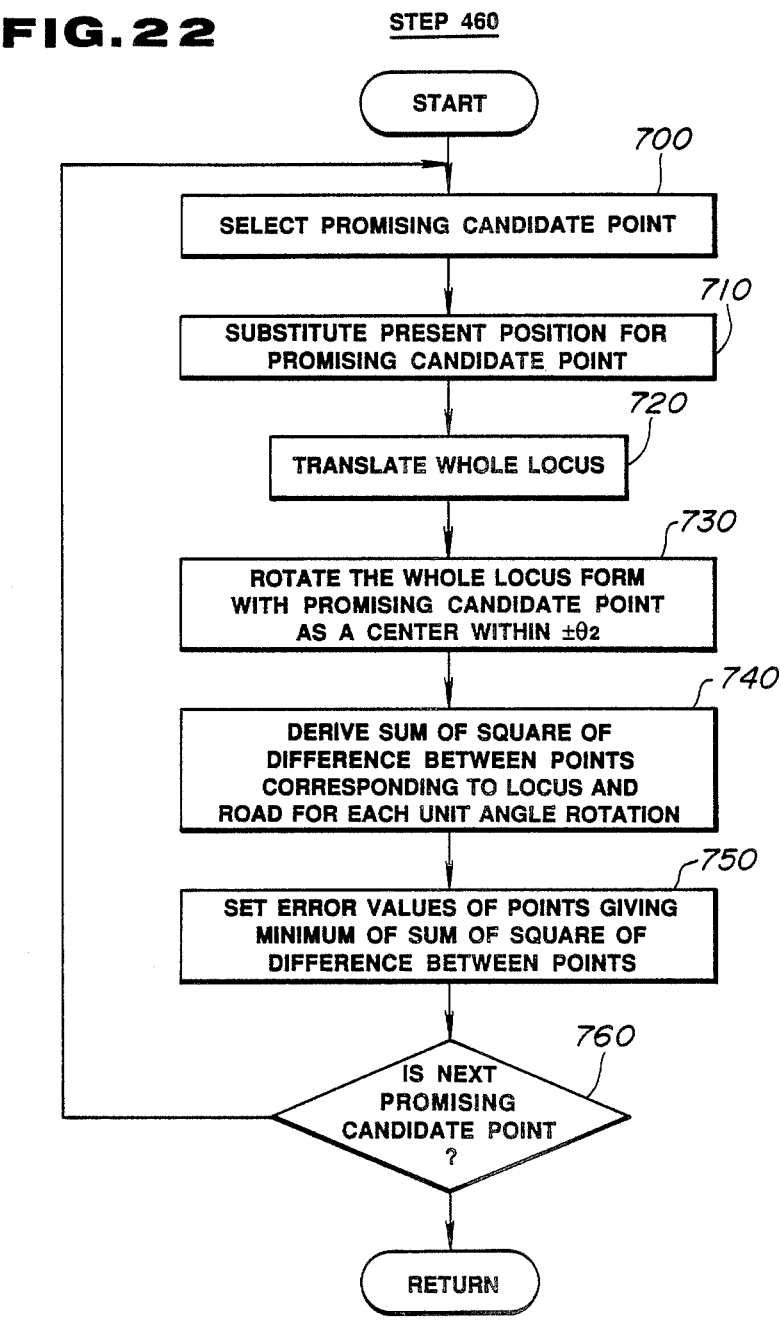
FIG.22 — STEP 460

SYSTEM AND METHOD FOR DISPLAYING PRESENT POSITION FOR MOVING OBJECT

BACKGROUND OF THE INVENTION (1) Field of the Invention

The present invention relates to a system and method for displaying a present position of a moving object applicable to a navigation system for a vehicle.

(2) Background of the Art

A Japanese Patent Application First Publication (non-examined) Showa 58-223016 published on Dec. 24, 1983 exemplifies a previously proposed system for displaying a present position of a moving object such as a vehicle on a road map image.

In the previously proposed system, a running distance of the vehicle is detected by a running distance detector, a travel direction is detected by a direction detector, a displayed map is sequentially updated as the present position is moved such that a displayed point indicating the present position of the vehicle is passed through the displayed map, and the displayed point is synthesized (superposed) so as to display on the updated map.

In more details, the present position $(X_t, Y_t)$ of the moving object at a certain time t in a plane of X-Y coordinates is derived from the following equation.

$$X_t = X_{t-1} + \Delta l \cos \theta_t$$

$$Y_t = Y_{t-1} + \Delta l \sin \theta_t$$

In the above two equations, $(X_{t-1}, Y_{t-1})$ denotes a previous position of the vehicle before $\Delta T$ second, $\Delta l$ denotes a running distance for a time $\Delta t$, and $\theta_t$ denotes a running direction for the time $\Delta t$.

However, since the previously proposed system calculates the present position by accumulating the running distances per unit time in the X-axis direction and in the Y-axis direction, respectively, detection errors of the running distance detector and direction detector are also accumulated. Thus, as the vehicle runs for a long period of time, large positional errors for the present position of the present position will eventually occur.

SUMMARY OF THE INVENTION

It is, therefore, an object of the present invention to provide a system and method for displaying a present position of a moving object which achieve accurate detection and display of the present position.

The above-described object can be achieved by providing a system for displaying a present position of a moving object, comprising: (a) first means for detecting a running distance of the moving object; (b) second means for detecting a running direction of the moving object; (c) third means for initially setting the present position of the moving object; (d) fourth means for deriving movement components in a horizontal direction per unit run distance and in a vertical direction per unit run distance when the moving object has moved on the basis of the unit run distance and running direction of the moving object derived from the first and second means; (e) fifth means for accumulating respective movement components derived by the fourth means with an initially set position of the moving object derived by the third means as a start point to derive the present position of the moving object; (f) sixth means for storing a locus data having the respective movement components in the horizontal and vertical directions per unit run distance derived by the fourth means; (g) seventh means for storing a road map information; (h) eighth means for selecting a road map information peripheral to the present position from the stored road map information of the seventh means; (i) ninth means for storing a display information to superpose and display the present position of the moving object on the road map information selected by the eighth means; (j) tenth means for displaying the contents of the ninth means on a screen thereof; (k) eleventh means for executing a pattern recognition between a road form based on the road map and a running locus form of the moving object based on the locus data; and (l) twelfth means for automatically correcting the present position of the moving object when a degree of coincidence between both patterns of the road form and locus form are relatively high.

The above-described object can also be achieved by providing a system for displaying a present position of a moving object, comprising the steps of: (a) first means for detecting a running distance of the moving object; (b) second means for detecting a running direction of the moving object; (c) third means for initially setting the present position of the moving object; (d) fourth means for deriving movement components in a horizontal direction per unit run distance and in a vertical direction per unit run distance when the moving object has moved on the basis of the unit run distance and running direction of the moving object derived from the first and second means; (e) fifth means for accumulating respective movement components derived by the fourth means with an initially set position of the moving object derived by the third means as a start point to derive the present position of the moving object; (f) sixth means for storing a locus data having the respective movement components in the horizontal and vertical directions per unit run distance derived by the fourth means; (g) seventh means for storing a road map information; (h) eighth means for selecting a road map information peripheral to the present position from the stored road map information of the seventh means; (i) ninth means for storing a display information to superpose and display the present position of the moving object on the road map information selected by the eighth means; (j) tenth means for displaying the contents of the ninth means on a screen thereof; (k) eleventh means for executing a pattern recognition between a road form based on the road map and a running locus form of the moving object based on the locus data; and (l) twelfth means for automatically correcting the present position of the moving object according to a result of the pattern recognition executed by the eleventh means.

The above-described object can also be achieved by providing a method for displaying a present position of a moving object, comprising the steps of; (a) detecting a running distance of the moving object; (b) detecting a running direction of the moving object; (c) setting an initial present position of the moving object; (d) deriving movement components in a horizontal direction per unit run distance and in a vertical direction per unit run distance when the moving object has moved on the basis of the unit run distance and running direction of the moving object derived in the steps (a) and (b) ;(e) accumulating respective movement components derived in the step (d) with an initially set position of the moving object derived in the step (c) as a start point to derive the present position of the moving object; (f) storing a locus data having the respective movement components in the horizontal and vertical directions per unit run distance derived in the step (d) ; (g) storing a road map information; (h) selecting a road map information peripheral to the present position from the stored road map information; (i) storing a display information to superpose and display the present position of the moving object on the road map information selected in the step (h) ; (j) displaying the stored contents in the step (i) on a screen thereof; (k) executing a pattern recognition between a road form based on the road map and a running locus form of the moving object based on the locus data; and (l) automatically correcting the present position of the moving object according to a result of the pattern recognition executed the step (k).

BRIEF DESCRIPTION OF THE DRAWINGS

FIG. 16 is a flowchart for explaining a procedure of selecting a point of candidate through a sequential relaxation executed in a step 440 in FIG. 9.

FIG. 17 is an explanatory view for explaining the memory locations of the D-RAM in which promising points of candidates are sequentially registered.

FIG. 22 is a detailed flowchart for explaining the details of a pattern match subroutine (step 460) shown in FIG. 9.

DETAILED DESCRIPTION OF THE PREFERRED EMBODIMENT

Reference will hereinafter be made to the drawings in order to facilitate a better understanding of the present invention.

Figure 1:
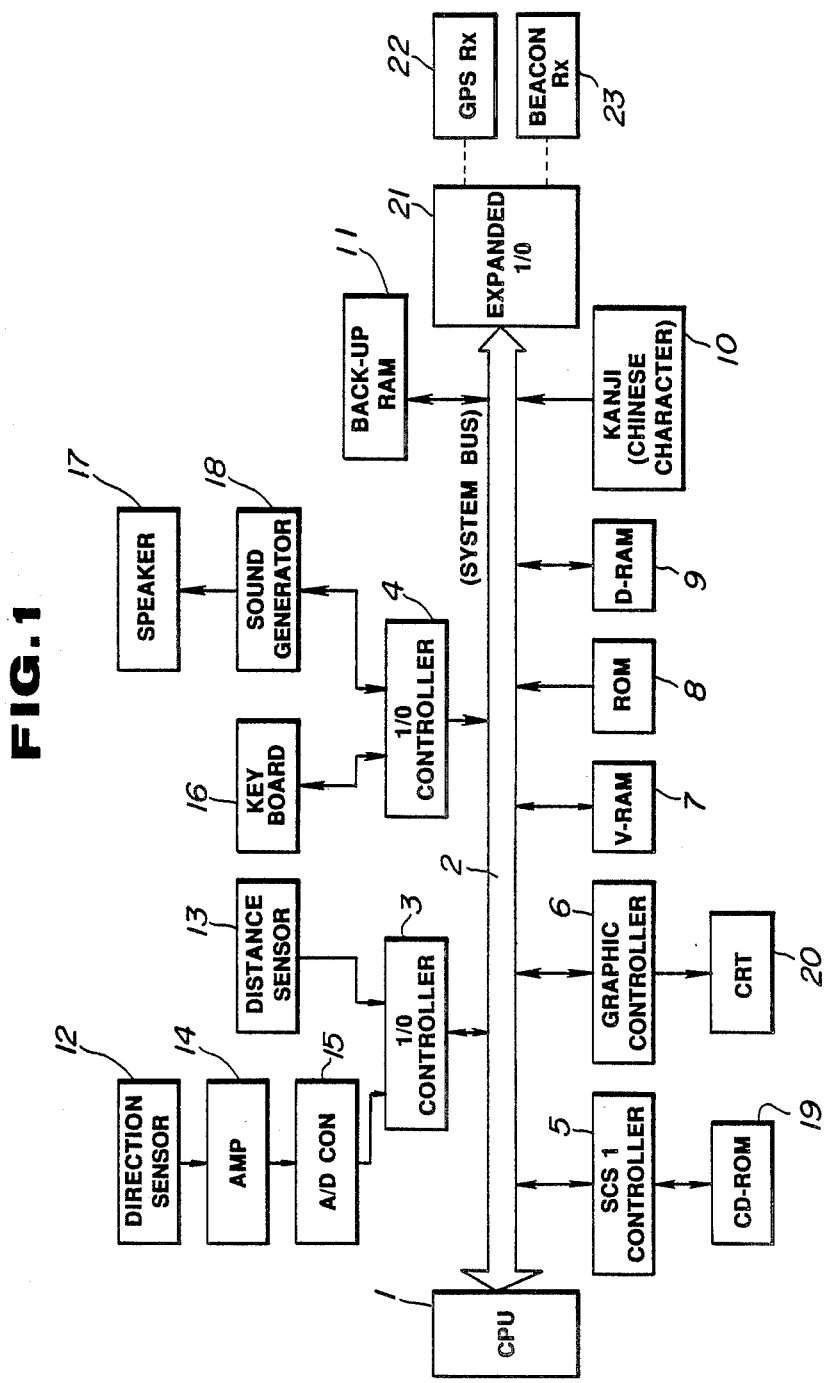
FIG. 1 is a schematic circuit block diagram of a system for displaying a present position of a moving object in a preferred embodiment according to the present invention.

FIG. 1 shows a hardware construction of a route guidance system for a vehicle to which a system for displaying a present position of a moving object according to the present invention is applicable.

The route guidance system shown in FIG. 1 includes a microcomputer having a CPU 1 (Central Processing Unit) which governs the whole system operation.

A system bus 2 is connected to I/O controllers 3 and 4, an SCSI controller 5, graphic controller 6, V (Video)-RAM 7, ROM 8, D (Drive)-RAM 9, Kanji (Chinese Character) ROM 10, and back-up RAM 11.

A directional sensor 12 is connected to the I/O controller 3 via an AMP 14 and A/D (Analog-to-Digital) converter 15 and a distance sensor 13 is connected to the I/O controller 3. (The structure of the directional sensor 12 is exemplified by a U.S. Pat. No. 4,442,609 issued on Apr. 17, 1984 and the structure of the distance sensor 13 is exemplified by a U.S. Pat. No. 4,699,507 issued on Oct. 13, both disclosures of which are hereby incorporated by reference.)

A key 16 provided on a key board for operating various inputs for the system, e.g., an initially set position of the vehicle, is connected to the I/O controller 4 and a speaker 17 is connected to a sound generator 18.

On the other hand, a CD (Compact Disc)-ROM (Read Only Memory) 19 and CRT 20 are connected, respectively, to the SCSI controller 5 and graphic controller 6.

A Cathode-Ray Tube (CRT) 20 which functions as a VDT (Visual Display Terminal) mainly carries out route guidance of the vehicle to a destination for a vehicle occupant including a driver and an image information to be displayed on the CRT 20 is temporarily written into the V-RAM 7 and the map information to be displayed on the CRT 20 is previously written into the CD-ROM 19.

Signal outputs of GPS (Geographic Positioning Satellite) Rx 22 and beacon Rx 23 can be utilized via an expanded I/O controller 21 together with those derived from the direction sensor 12 and distance sensor 13 for the confirmation and detection of the present absolute position of the vehicle.

The CPU 1 executes a system program (Operating System, OS) stored in a ROM (Read Only Memory) 8 to perform an overall control of the system.

Figure 2:
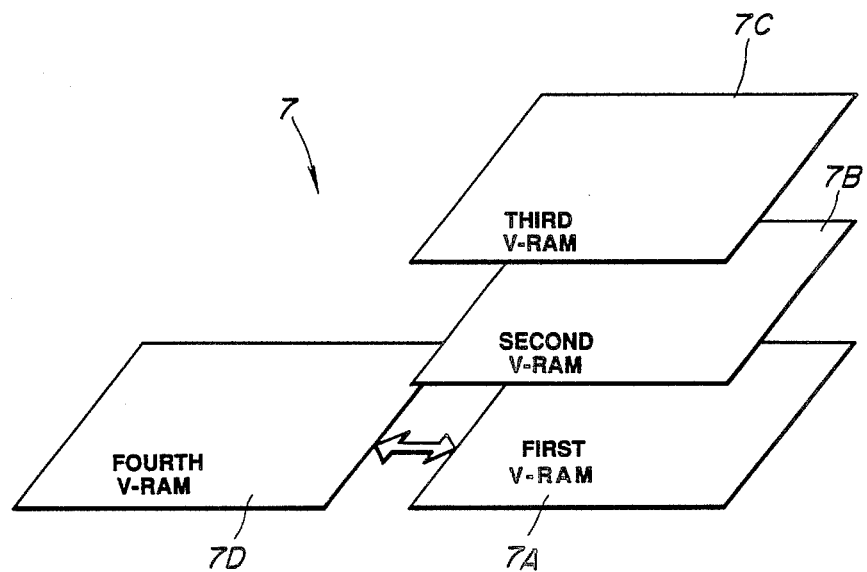
FIG. 2 is a schematic drawing of a V-RAM shown in FIG. 1.

FIG. 2 shows an explanatory view of the contents of the V-RAM 7 shown in FIG. 1.

In FIG. 2, the V-RAM 7 includes a first V-RAM 7A for depicting a form of a road R, a second V-RAM 7B for depicting place names, etc., a third V-RAM 7C for displaying the present position and locus K of vehicle running, and a fourth V-RAM 7D for depicting enlarged and scaled-down maps. The V-RAM 7A for depicting the form of the road is constituted so as to provide a working area for drawing a road data, as will be described later, and for performing a pattern matching of the road map data and locus data, as will be described later.

It is noted that in a case where various kinds of information are displayed on the CRT 20, some pages of each V-RAM 7A through 7D are arbitrarily retrieved, superposed, and displayed through the CRT 20.

Figure 3:
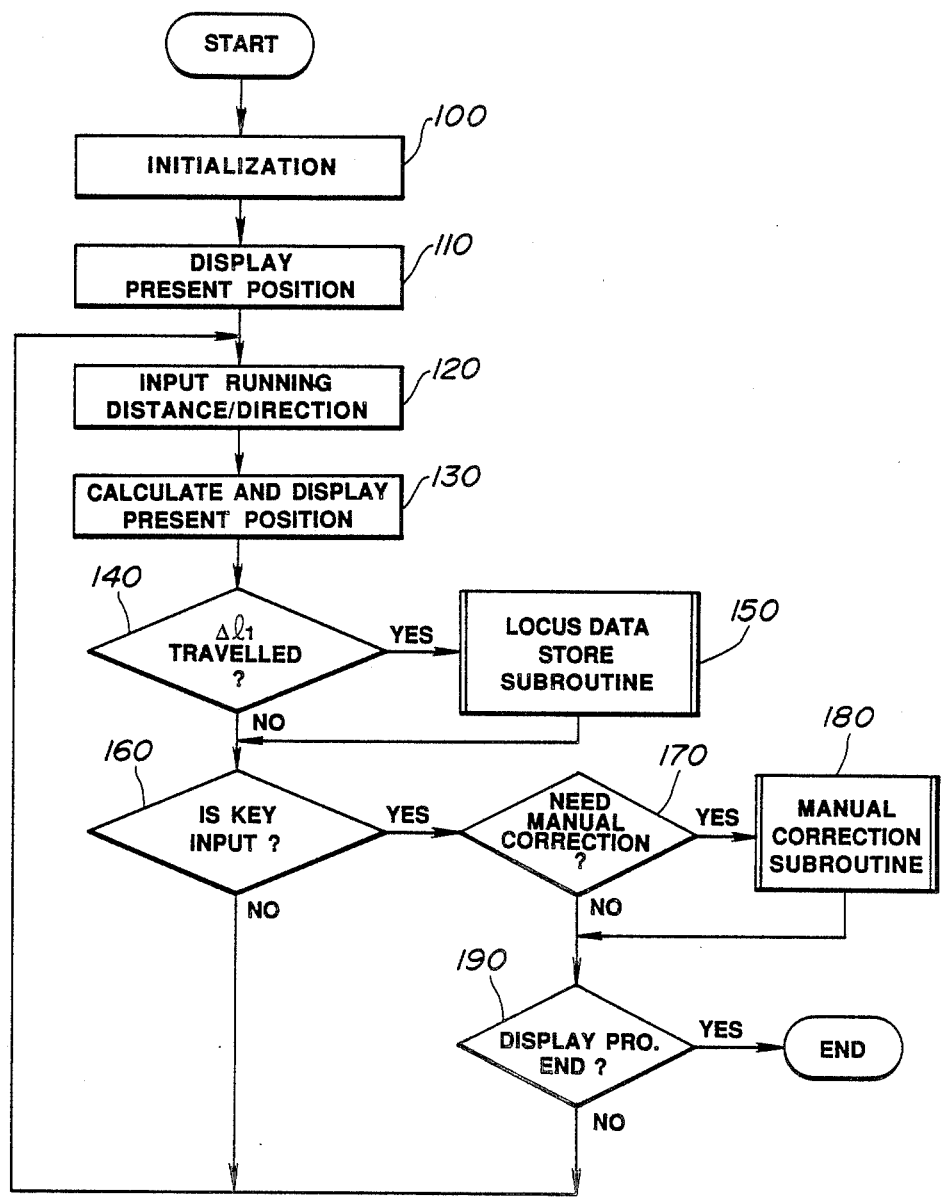
FIG. 3 is a general flowchart for explaining a series of processes executed in the preferred embodiment shown in FIG. 1.

FIG. 3 shows a general flowchart of a control program stored in the ROM 8 shown in FIG. 1 on which the system is executed.

The whole construction of the control program will hereinbelow be described with reference to FIG. 3.

In a step 100, an initialization is carried out upon start of the main program.

In a step 110, an initial position of the vehicle is inputted and the present position of the vehicle and peripheral road map around the present position of the vehicle are simultaneously displayed through the CRT 20.

Upon completion of the initialization and display processing of the present position, the system is in operation and in steps 120, 130, the present position detected by the direction sensor 12 and distance sensor 13 causes a sequential rewrite and a synthetic display of the displayed map on the screen of the CRT 20.

When such synthetic (superimpose) display processings on the present position and its peripheral road map are repeated, the CPU 1 determines whether the vehicle has advanced over a unit distance denoted by $\Delta l_1$ in a step 140.

If yes in the step 140 (the vehicle has advanced over $\Delta l_1$), the routine goes to a subroutine (step 150) for storing a locus data, as will be described later. Thus, a calculation processing such as to derive the present position of the vehicle utilizes the locus data which is essential to the present invention.

On the other hand, in a case where the vehicle has not advanced over $\Delta l_1$ (No in the step 140), the routine goes to a step 160 in which the CPU 1 determines whether a key input is present. If no key input is present (No in the step 160), the series of processings of the steps 120 through 150 are repeated. If Yes in the step 160 (the key input is present), the CPU 1 determines whether a manual correction is approved in a step 170.

If Yes in the step 170 (manual correction is needed), the routine advances a manual correction subroutine (step 180). If no manual correction is needed in the step 170 (No), the CPU 1 determines whether the present position display processing is ended in a step 190. If yes in the step 190, the display processing is ended.

Next, the subroutine of manual correction processing will be described with reference to FIG. 8.

Figure 8:
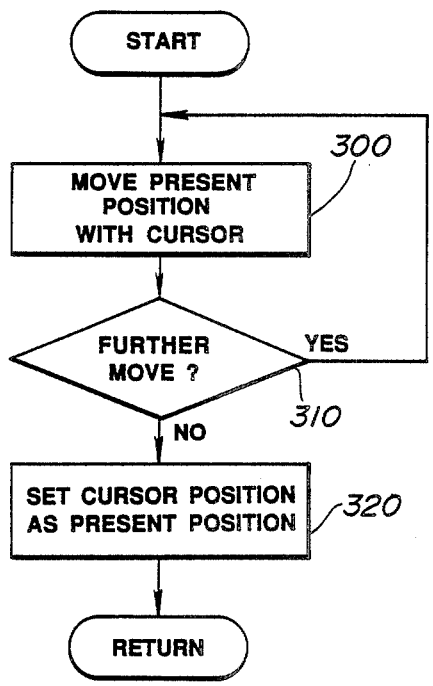
FIG. 8 is a detailed flowchart for explaining details of a manual correction subroutine (step 180) shown in FIG. 3.

The subroutine shown in FIG. 8 is executed when an automatic correction for displaying the present position, as will be described later, becomes impossible. For example, this routine is executed in a case where the vehicle runs on a road whose map is not stored into the CD-ROM 19 for a long distance or in a case where the vehicle runs on a route (marine) except a land, e.g., using a ferry boat.

In steps 300 through 320, the setting of the vehicle present position is carried out, conversing with one of the maps which has been displayed on the screen of the CRT 20 and moving a cursor (not shown) through an operation of the key 16.

Figure 4:
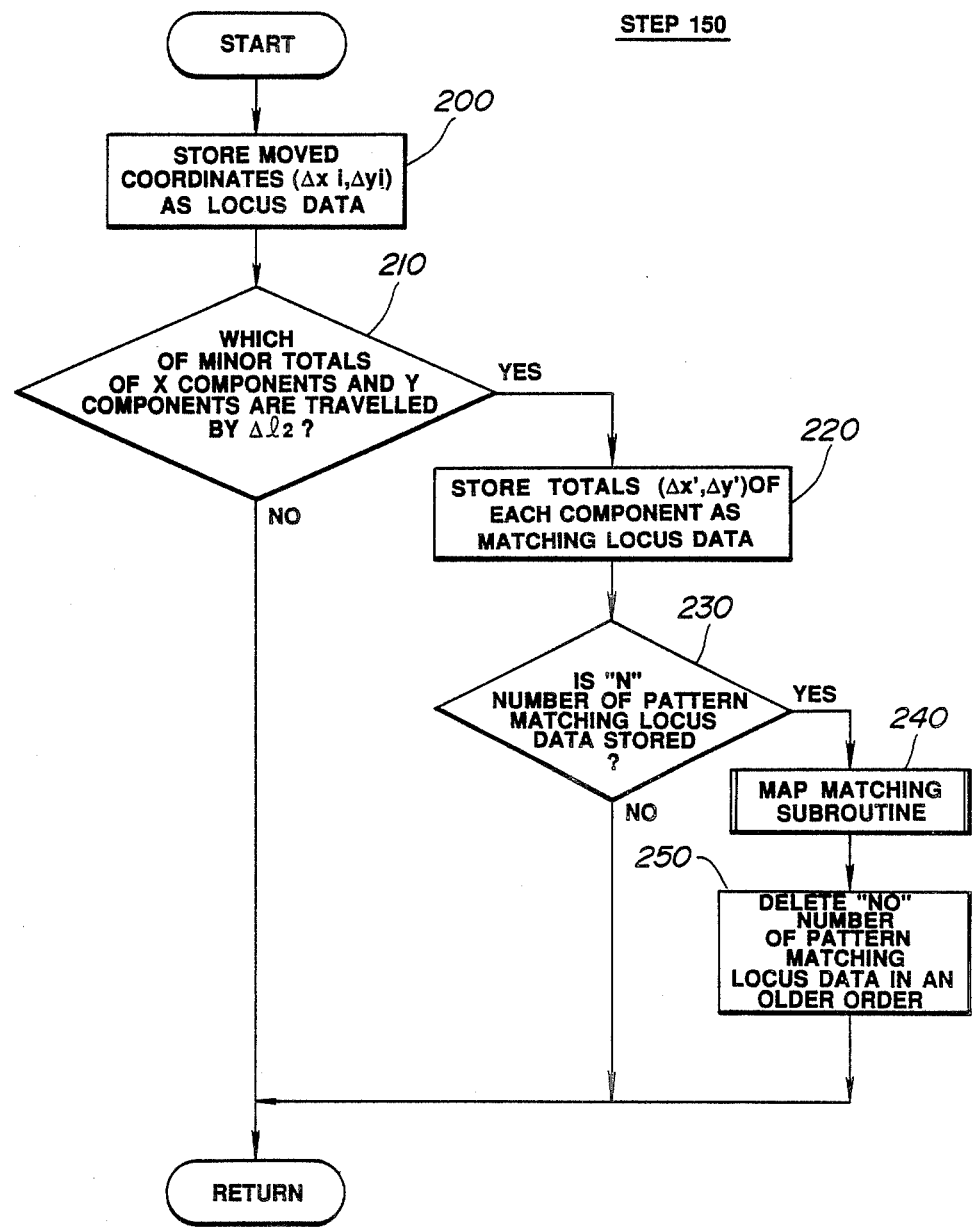
FIG. 4 is a detailed flowchart of a locus data store subroutine (step 150) in FIG. 3.

FIG. 4 shows the subroutine (step 150) for storing the locus data. The essential portion of the system in the preferred embodiment will be described in accordance with the subroutine shown in FIG. 4.

Upon start of the program, movement components in x- and y-axis directions for each unit distance ($\Delta x_i$, $\Delta y_i$) are stored as the locus data in a step 200.

Figure 5:
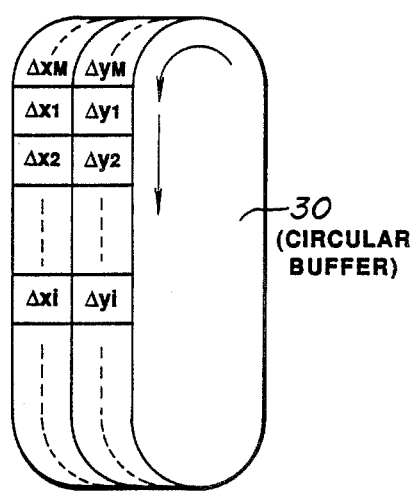
FIG. 5 is an explanatory view of a circular buffer in which a locus data for each running distance per unit time is sequentially stored.

The locus data is stored into a circular buffer 30 installed in the D-RAM 9 as shown in FIG. 5.

The circular buffer 30 is constructed so as to store a required number of locus data in such an order as ($\Delta x_1$, $\Delta y_1$), ($\Delta x_2$, $\Delta y_2$),—($\Delta x_M$, $\Delta y_M$) by a past M number of the locus data.

In the next step 210, the CPU 1 determines whether a minor total of movement components in the x-axis (horizontal) direction and y-axis (vertical) direction from among the locus data stored in the step 200 exceeds $\Delta l_2$.

This is because the movement components stored in the step 200 are subjected to more precise discrete processing. In a step 210, the CPU 1 determines whether the minor total of the movement components in the x-axis direction and y-axis direction from among the locus data stored in the step 200 exceed $\Delta l_2$.

If Yes in the step 210, i.e., whenever the minor sum of the movement components in the x-axis and y-axis directions has exceeded $\Delta l_2$ in order to further coarsely provide discrete processing for the movement components stored in the step 200 for later processing conveniences, the routine goes to a step 220 in which the minor total of $\Delta x_i$ and that of $\Delta y_i$ are stored in the D-RAM 9 as the pattern matching locus data ($\Delta x'$, $\Delta y'$).

For example, supporting that $\Delta x_1 + \Delta x_2 + \Delta x_3 = \Delta x_t$, $\Delta y_1 + \Delta y_2 + \Delta y_3 = \Delta y_t$, and the minor total in the x-axis direction, i.e., $\Delta x_t$ is expressed as $\Delta x_t \geq \Delta l_2$, the present data ($\Delta x_t$, $\Delta y_t$) is stored as the locus data to be subjected to a pattern matching ($\Delta x_i'$, $\Delta y_i'$).

Figure 6:
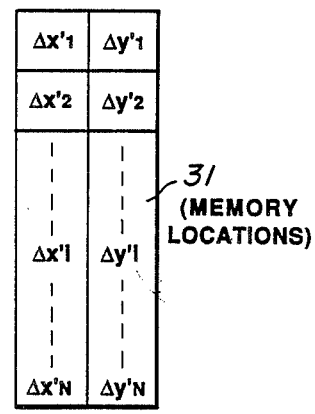
FIG. 6 is an explanatory view of memory locations of D-RAM shown in FIG. 1 in which the locus data for each predetermined distance run is sequentially stored.

FIG. 6 shows a memory configuration of memory locations 31 within the D-RAM 9 in which the above-described pattern matching locus data ($\Delta x'$, $\Delta y'$) are stored.

Then, in a step 230, the CPU 1 determines whether N number of the locus data for pattern matching are stored (N<M).

If Yes, i.e., the N number of the locus data are collected as shown in FIG. 6, the routine goes to a step 240 in which a map matching subroutine is executed as will be described later.

Upon completion of the processing of a step 240, the routine goes to a step 250 in which No number of locus data from the N number of the collected pattern matching locus data ($\Delta x'$, $\Delta y'$) are deleted in the older order (provided that No<N).

Figure 7:
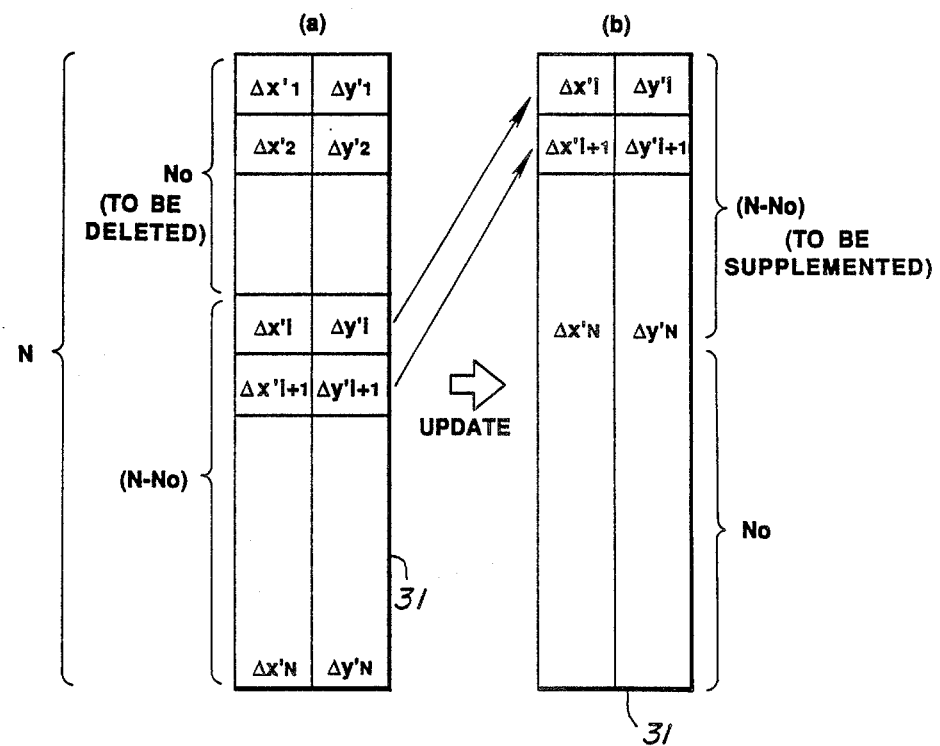
FIG. 7 is an explanatory view of a supplemental (update) action of the locus data stored in the memory locations.

FIG. 7 shows a processing method executed in the step 250. In the memory locations 31, (N - No) number of the data are left therein.

Then, as shown in (b) of FIG. 7, the map matching processing is executed in the step 240 whenever the No number of the pattern matching locus data ($\Delta x'$, $\Delta y'$) are newly supplemented into the corresponding memory locations 31.

Figure 9:
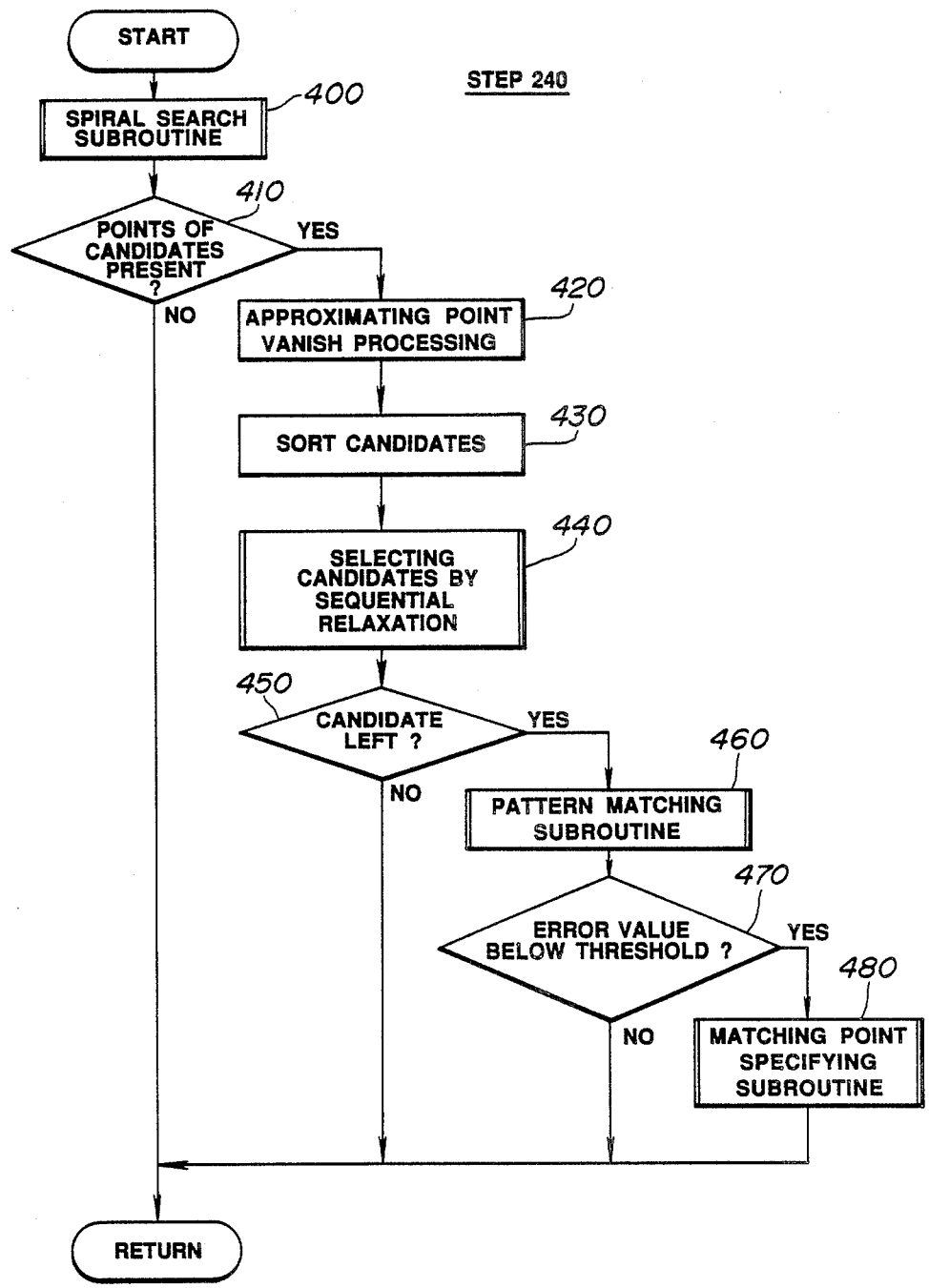
FIG. 9 is a detailed flowchart for explaining details of a procedure of a map matching subroutine (step 240) in FIG. 4.

FIG. 9 shows a detailed flowchart of the above-described map matching subroutine (step 240).

Figure 10:
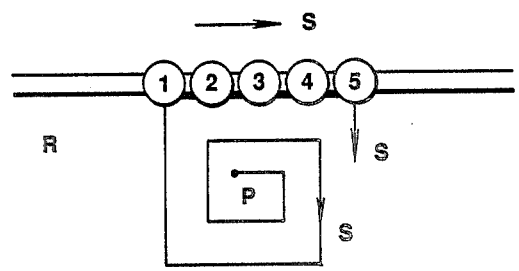
FIG. 10 is an explanatory view for explaining a procedure in a case where points of candidates detected on a road are sorted in an order in which a point on a road which is nearest to the present position is first.

In a step 400, a point of candidate which is determined as the present position of the vehicle on any one of roads surrounding the present position is spirally searched (refer to FIG. 10).

If the point of candidate to automatically correct the present position is present on any one of the peripheral roads as the result of the above-described spiral search in the step 410, the routine goes to a step 420 in which an approximate point vanish processing, as will be described below, is executed.

That is to say, in the processing of the step 420, any two points of candidate whose mutual interval distance is too approximate (too short) is deleted.

For example, if in any two points of candidate, the manual distances are shorter than $l_3$ which corresponds to three parallel pixels on the V-RAM 7A, one of the two points of candidate is deleted (vanished).

The step of 420 can, thus, reduce a number of times complicated calculations are carried out at the subsequent steps of calculating the present position on the basis of the points of candidate for the present position of the vehicle.

In a sorting processing of the candidate points of a step 430, the points of candidates derived in the preceding processing (steps 400, 410, 420) are rearranged in an order of the candidate points which are nearer to the present position (, i.e., the nearest point of candidate is first).

As shown in FIG. 10, in a case where the points of candidates are searched spirally in an arrow-marked direction denoted by S with the present position of the vehicle P as the center, the points of candidates are derived in such an order as ①→②→③→④→⑤ in accordance with the order of searching on the road R.

In FIG. 10, a point of candidate nearest to the present position is ③. However, the searched point ③ of the candidate is late in the order than ① and ②, as appre-
ciated from FIG. 10. Then, the processing of step 430 causes an order rearrangement of the points of candidate in such an order that each point of candidate nearer to the present position P becomes earlier.

Hence, in the example of FIG. 10, the order is rearranged as ③→②→①→④→⑤.

In a step 440, an overlapping of the running locus and road for each point of candidate derived heretofore is carried out, a selection of the point of candidate is carried out in such a way that a point at which the overlapping can be made through a relaxation within a range defined by a certain allowance limit is determined as a promising point of candidate.

In a step 450, the CPU 1 determines whether the promising point of candidate is left as the result of such a selection. If Yes in the step 450 (the promising point of candidate is left), the routine advances the pattern matching subroutine in a step 460.

In the step 460, the CPU 1 carries out the rotation of the running locus (trajectory), with the promising point of candidate as a center, as will be described later, and derives an error value of a corresponding point on the road with respect to the promising point of the candidate.

In a step 470, the CPU 1 determines whether at least one promising point of candidate such that the error value is below a threshold value is present.

If there is a promising point of candidate whose error value is below the threshold value in the step of 470, the routine goes to a step 480 in which a matched point specifying subroutine is executed.

In a step 480, the present position of the vehicle is corrected to a most suitable position from among the plurality of promising points of candidate on the basis of the result of calculations of a standard deviation and correlative coefficient of each promising point of candidate, as will be described later.

Hereinafter, the procedure of steps 400 through 480 will be described in details.

Figure 11:
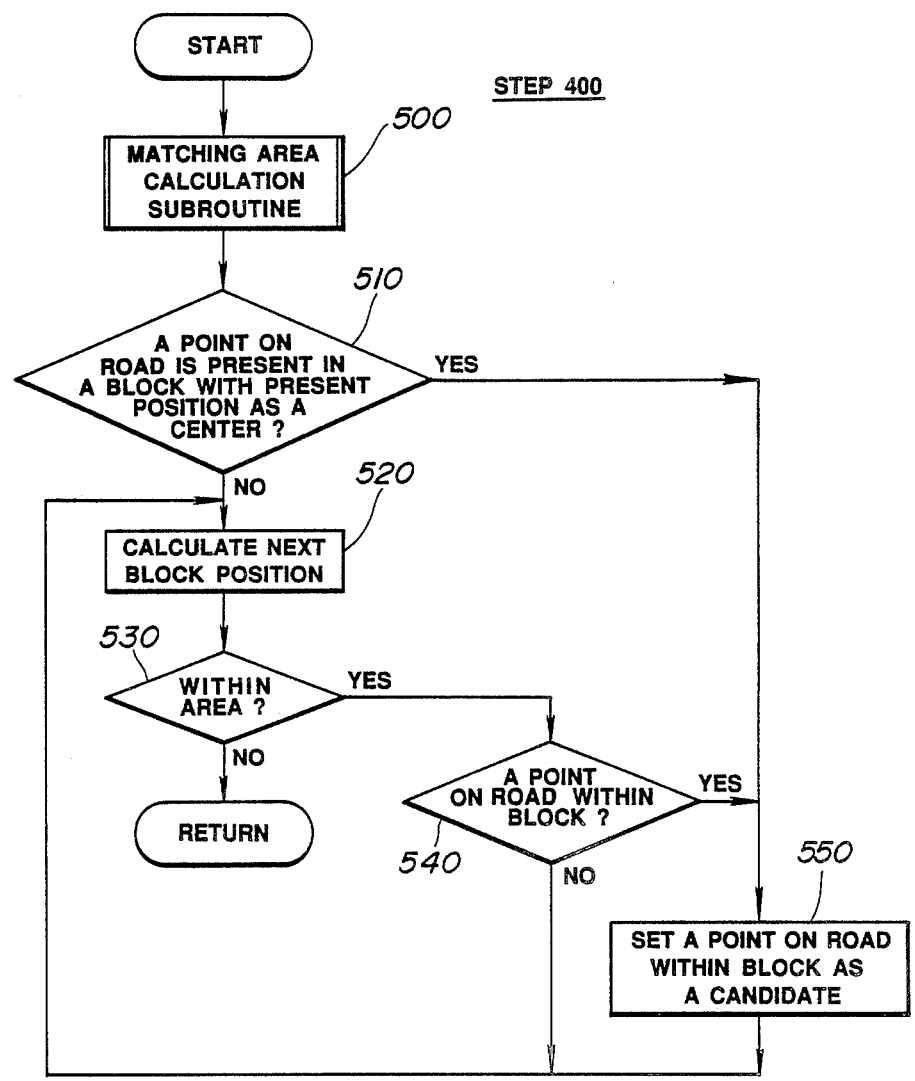
FIG. 11 is a detailed flowchart for explaining details of a spiral search subroutine (step 400) shown in FIG. 9.

FIG. 11 shows a detailed spiral search subroutine in the step 400.

In the processing shown in FIG. 11, a width of an area to be searched is calculated in a step 500.

Figure 15:
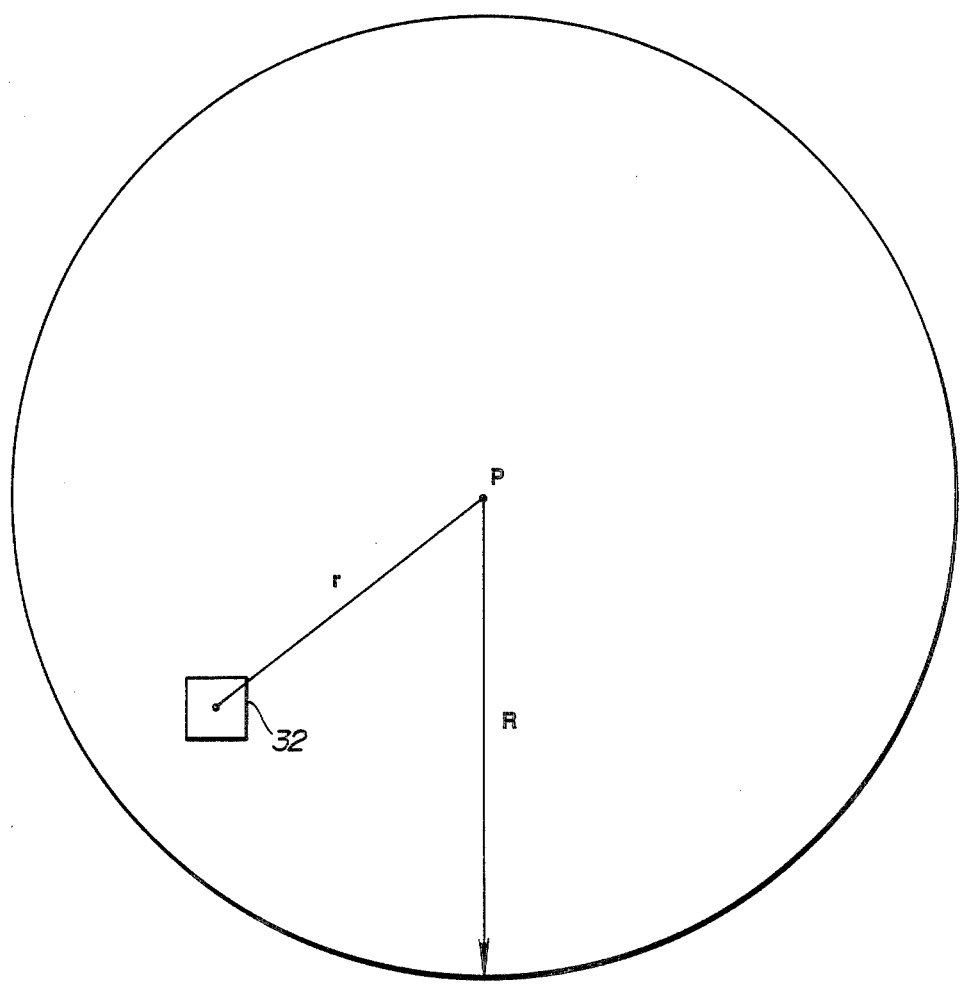
FIG. 15 is an explanatory view for explaining an area of a searched block in FIG. 11.

The width of the area is denoted by a circle having a radius of R with the present position as a center, as shown in FIG. 15. To calculate the radius of R, an output error of the direction sensor 12, drawing error of the map, and accuracy value when the position is previously corrected are based. The value of R may be rough and may fall in a range such that at least the present position of the vehicle to be naturally corrected is included in the circle.

For example, hence, the value of R can be derived in accordance with the following equation:

$$R = R_{-1} + a \times (b - E) + c \times L$$

In the equation described above, $R_{-1}$ denotes the value of R at the previous time of correction, E denotes a probability density of a previously corrected position, L denotes a running distance from a previously corrected position, and a, b, and c denote constants.

It is noted that the probability density E can be derived in the following equation.

$$E = \tfrac{1}{2}\pi\sigma\, x_a\, \sigma y \times e^{x_a p} \\ x[-\tfrac{1}{2}\{((x_a - \bar{x})^2/\sigma x^2 + (y - \bar{y})^2/\sigma y^2\}]$$

In the equation described above, $\bar{x}$, denotes a value of x coordinate of the previously position corrected point, y denotes a value of the y coordinate of the previously position corrected point, $\bar{x}$ denotes an average value of the x-axis coordinate of the previous promising point of candidate, $\bar{y}$ denotes an average value of the y-axis coordinate of the previous promising point of candidate, $\sigma x$ denotes a deviation of the x coordinate of the previous promising candidate point, $\sigma y$ denotes a deviation of the y coordinate of the promising point of candidate.

It is noted that the positional error is independent in the x axis and y axis directions and accords with a normal distribution.

When the radius R of the area to be searched is derived through the processing of the step 500, the CPU 1 searches whether a point on the road is present in the circle having the radius of R in a step 510.

Figure 12:
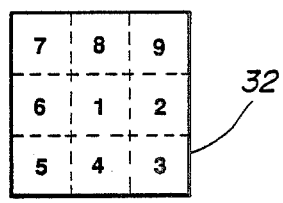
FIG. 12 is an explanatory view for explaining an arrangement order of pixels in a set state of a block on a displayed image for the spiral search in FIG. 11.

Such a searching as described above in the step 510 is carried out to check whether the point on the road is present within the square-formed block 32 having each side of three parallel pixels drawn on the V-RAM 7A (for drawing the form of road), as shown in FIG. 12.

That is to say, the CPU 1 determines whether the block 32 constituted by pixels of 1 through 9 is set spirally in the clockwise direction, the pixel placed on the center being 1. If the pixels 1 through 9 which are spirally set as described above are present, the CPU 1 determines that the point on the road is present within the corresponding block (Yes in the step 510) and determines the point of the road within the block thus found present as one point of candidate in a step 550.

On the other hand, if the pixels within the searched block are not set in a state shown in FIG. 12, the calculation of the block position next to be searched is executed in a step 520.

Figure 13:
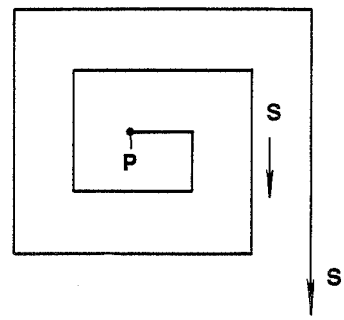
FIG. 13 is an explanatory view for explaining a next block position search in FIG. 11.

The calculation of the subsequent block position is executed in such a way as in a spiral form as denoted by the arrow-marked direction S with the present position P as a center so as not to overlap with the block which has previously been searched, as shown in FIG. 13.

Figure 14:
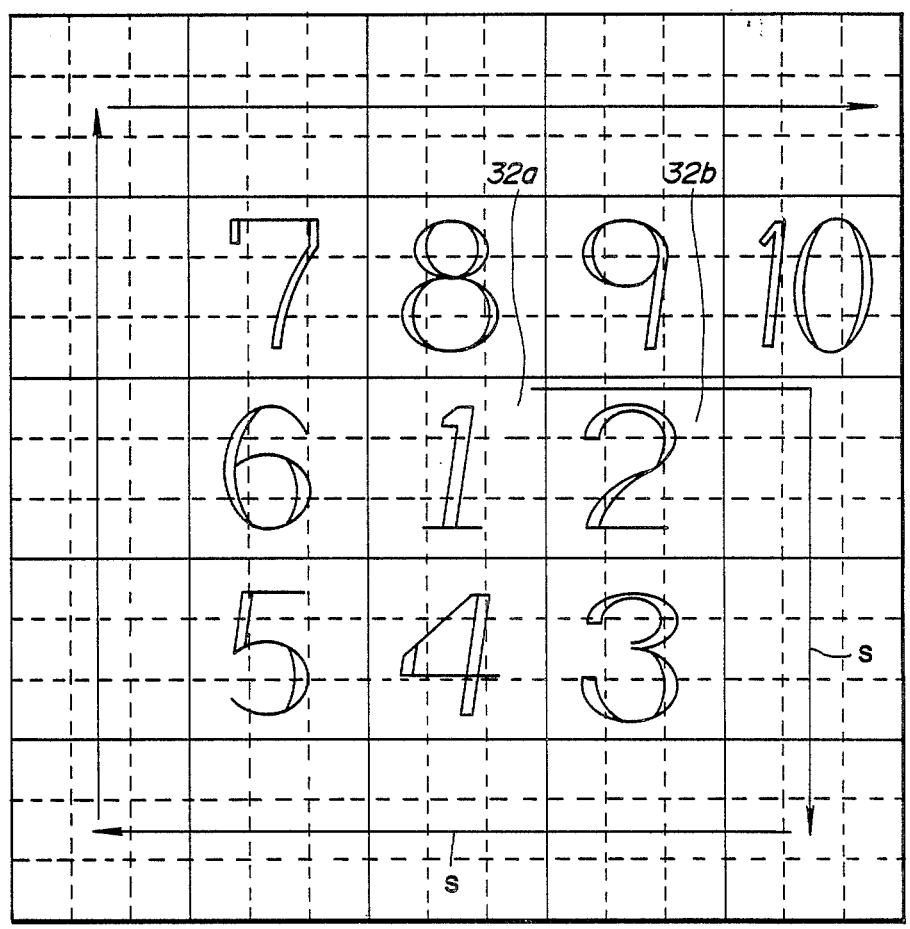
FIG. 14 is an explanatory view for explaining the spiral search for the next block position in FIG. 11.

FIG. 14 is an explanatory view of the result of calculation of the subsequent block position.

After the pixels are set the state of the first block 32a is searched at the first place, the CPU 1 calculates the subsequent block positions to be spirally searched in the arrow-marked direction S in such an order as 1, 2, 3, —, 10, —, as shown in FIG. 14.

In a step 530, the CPU 1 determines whether the next block position thus calculated falls in a radius of R with the present position P as a center.

As shown in FIG. 15, the CPU 1 determines that $r < R$ and it falls in the area (Yes) and the routine goes to a step 540 in which the set state of each pixel in the block 32 is determined.

If the pixels are spirally set in the step 540 (Yes), the CPU 1 determines that a point is present on the road within the block and the point on the block is detected as the point of candidate in a step 550.

On the other hand, if the pixels within the block to be searched are not in the spirally set state and the corresponding point on the road is not detected (No in the step 540), the new subsequent block search is executed in the order shown in FIG. 14.

Such a processing as described above (steps 520 through 550) is executed for all blocks which fall in the radius R of the circle with the present position P as a center.

In this way, when the point of the road is derived as the point of candidate in the circle of radius R with the present position P as the center, the processings of the steps 410 through 430 are carried out. Then, such a processing as the selection of the point of candidate through a sequential relaxation is carried out.

FIG. 16 is a detailed flowchart of the above-described step 440 shown in FIG. 9.

In the above-described processing, any one point on the road detected in the processing of step 550 is selected in a step 600.

In a step 610, the CPU 1 carries out such that the locus form is sequentially relaxed on the basis of the selected point of candidate, searching the points on the road.

Figure 18:
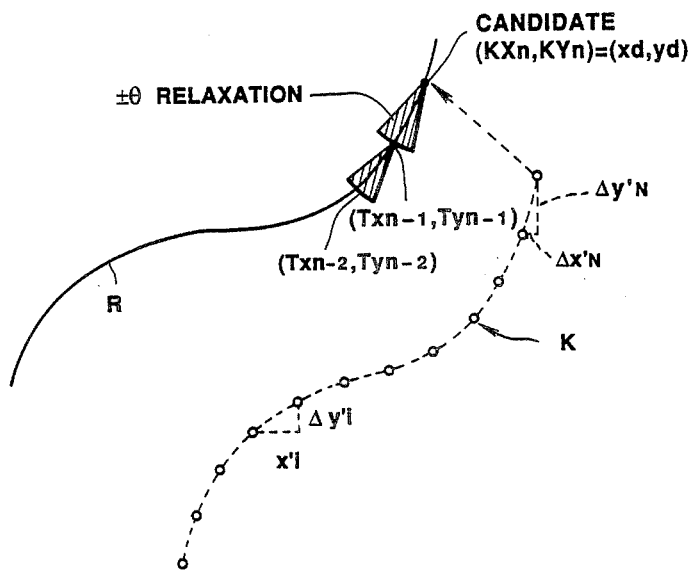
FIG. 18 is an explanatory view for explaining an action for searching points on the road, sequentially relaxing a locus form executed in a step 610 of FIG. 16.

As shown in FIG. 18, suppose that the selected point of candidate is (xd, yd). The CPU 1 subtracts the N order data ($\Delta x_{N'}$, $\Delta y_{N'}$) which is the last data of the locus data stored in the memory locations 31 from the selected point of candidate (xd, yd).

This derives the coordinates ($Kx_{n-1}$, $Ky_{n-1}$) before one unit distance from the present position when the locus K itself is parallel transformed onto the road.

That is to say, $$Kx_{n-1} = xd - \Delta x_{N'},$$

$$Ky_{n-1} = yd - \Delta y_{N'},$$

(Provided that $Kxn = xd$ and $Kyn = yd$).

To pick up a point on the road corresponding to ($Kx_{n-1}$, $Ky_{n-1}$), the CPU 1 searches whether the point on the road is present within a range of $\pm 0°$, with the point of candidate (Kxn, Kyn) shown in FIG. 18 as a center, with the running direction at the point of candidate (Kxn, Kyn) as a reference, and on a circumference of a circle having a radius expressed as follows: $\sqrt{(\Delta x_{N'})^2 + (\Delta y_{N'})^2}$.

Then, if such a point as defined as above is present, this point is set as the point on the road ($Tx_{n-1}$, $Ty_{n-1}$) corresponding to ($Kx_{n-1}$, $Ky_{n-1}$).

On the other hand, if the above-described point is not present, the CPU 1 determines it as the not corresponding point and sets ($Tx_{n-1}$, $Ty_{n-1}$) in the following:

$$Tx_{n-1} = Kx_{n-1}$$

$$Ty_{n-1} = Ky_{n-1}.$$

Furthermore, $$Kx_{n-2} = Tx_{n-1} - \Delta x_{N-1}',$$

$$Ky_{n-2} = Ty_{n-1} - \Delta y_{N-1}'.$$

In the same technique, the CPU 1 derives ($Tx_{n-2}$, $Ty_{n-2}$) by relaxing ($Kx_{n-2}$, $Ky_{n-2}$) with ($Kx_{n-1}$, $Ky_{n-1}$) as a center.

Figure 19:
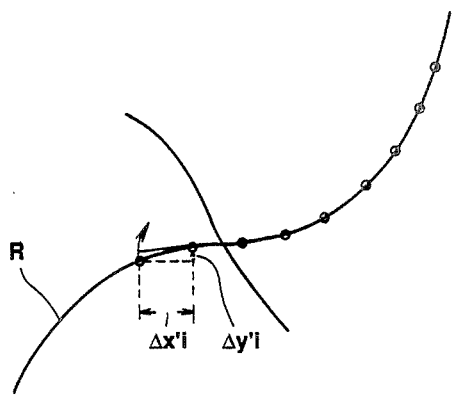
FIG. 19 is an explanatory view for explaining the action for searching points on the road, sequentially relaxing the locus form executed in the step 610 of FIG. 16.

Thereafter, the relaxation is repeated for each locus data ($\Delta xi'$, $\Delta yi'$) stored in the memory location 31, as shown in FIG. 19.

In a step 620, the CPU 1 determines whether N number of locus data ($\Delta xl'$, $\Delta yl'$)—($\Delta x_{N'}$, $\Delta y_{N'}$) correspond to the points on the road R.

When all N number of locus data correspond to the points on the road (Yes in the step 620), the points of candidates (xdi, ydi) are registered into the memory location 34 within the D-RAM 9 as the promising points of candidate of the present position of the vehicle as shown in FIG. 17, in a step 630.

The above-described processing is carried out for all points of candidates in a step 640.

Thus, the effective selection of the point of candidate and drawing out of the road form can simultaneously be executed.

In the series of processings shown in FIG. 16, which shows the details of the step 440, when all N number of the locus data stored in the memory location 31 correspond to the points on the road, the points of candidate are registered as the promising points of candidate. However, if all N number of locus data do not correspond to the points on the road, corresponding points of candidates are registered as the promising points of candidate as shown in a flowchart of FIG. 20.

Figure 20:
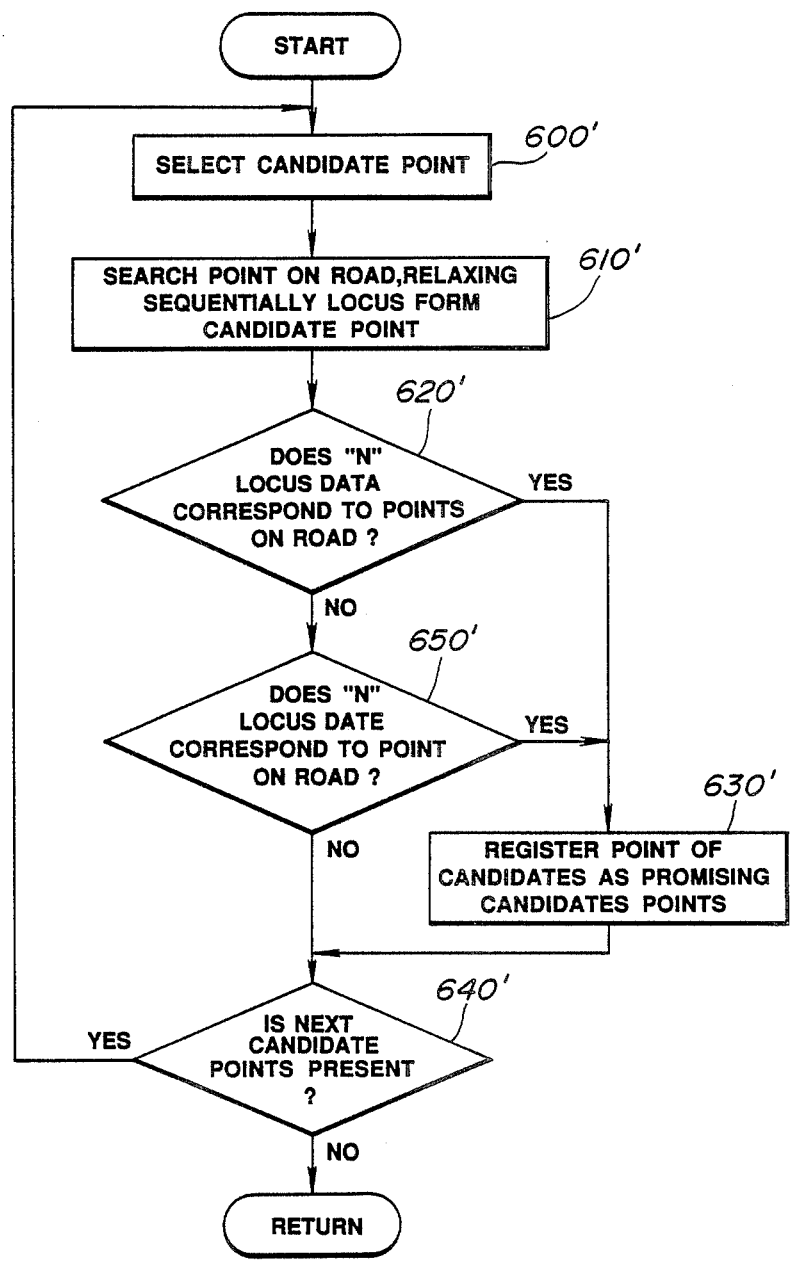
FIG. 20 is a detailed flowchart for explaining another procedure for selecting the point of candidate through the sequential relaxation.

The feature of procedure shown in FIG. 20 is that even if the CPU 1 determines that all N number of the locus data do not correspond to the point on the road (No in a step 620′), the CPU 1 determines whether the number of the points which do not correspond to the points of the road fall in the range of a constant ΔN in a step 650′. If it falls in the constant ΔN (Yes in a step 650′), the corresponding points of candidate are registered as promising points of candidate in a step 630′.

Figure 21:
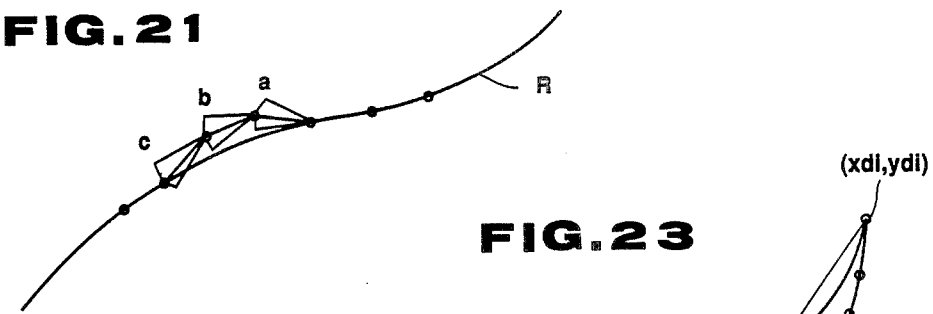
FIG. 21 is an explanatory view of the locus data in a case when the locus data does not partially correspond to those on the road in FIG. 20.

FIG. 21 shows an example of result of such a procedure as described above in the case of FIG. 20. In FIG. 21, the locus data a and b are not placed on the road R.

However, in the example shown in FIG. 20, in the case where the locus data not placed on the road R is below the constant, the picked-up points of candidate are registered as the promising points of candidate.

Therefore, even if the road form stored in the CD-ROM 19 is more or less different from the actual form of the road, there is not problem. Then, even if a recirculation due to road construction and generation of local error of the sensor(s) occur, there is no problem.

After the processing in the step 440 is carried out, the pattern matching processing is carried out in the step 460 utilizing the promising points of candidate.

FIG. 22 shows the detailed flowchart of processing the step 460.

In a step 700 of FIG. 22, the CPU 1 picks up one of the promising points of candidates derived in the step 440.

Figure 23:
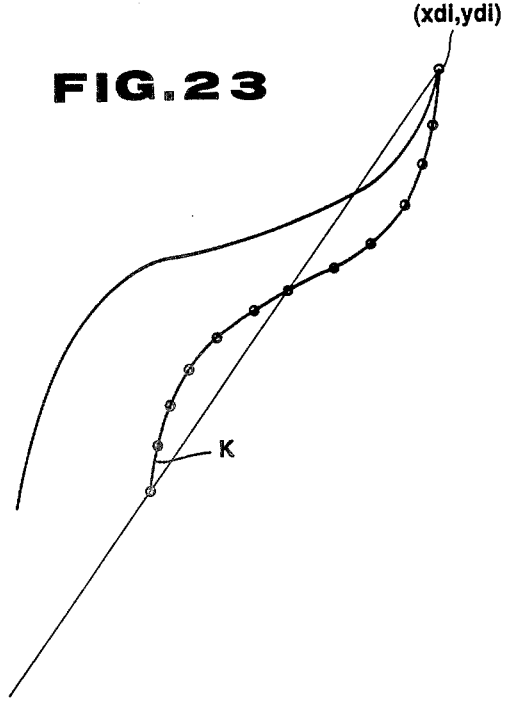
FIG. 23 is an explanatory view for explaining an action of the pattern matching.

In steps 710 and 720, supposing that the present position of the vehicle is placed on the picked up promising point of candidate, the CPU 1 carries out a parallel translation of a whole locus form K with the present position substituted for the promising point of candidate (xdi, ydi) shown in FIG. 23.

Figure 24:
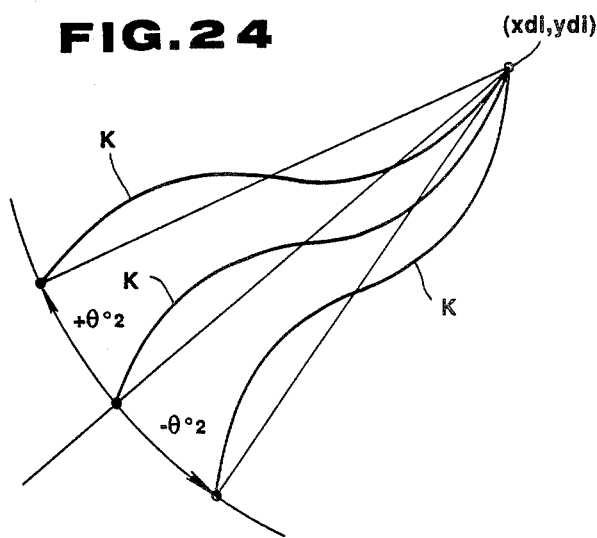
FIG. 24 is an explanatory view for explaining the action of the pattern matching.

In a step 730, the CPU 1 carries out a rotation of the whole locus form K within a range of $\pm\theta_2°$ for each unit angle with the promising point of candidate (xdi, ydi) as a center, as shown in FIG. 24.

In a step 740, the CPU 1 derives a minimum value $E_{min}$ of a square sum E of a distance between each point on the locus form K and a corresponding point on the road form R, both points constituting one of point rows between the road and locus forms.

$$E_{min} = \min_{-\theta_2 < \theta < +\theta_2} \sum_{j=1}^{N} [\{KX_\theta(i) - Tx(i)\}^2 + \{Ky_\theta(i) - Ty(i)\}^2]$$

In the above equation, $Kx_\theta(i)$ denotes the x coordinate in the i order when the whole locus form is rotated through $\theta°$, $Ky_\theta(i)$ denotes the y coordinate in the i order when the whole locus form is rotated through $\theta°$, Tx(i) denotes the x coordinate of the point on the road corresponding to $Kx_\theta(i)$, and Ty(i) denotes a y coordinate of the point on the road corresponding to $Ky_\theta(i)$.

Figure 25:
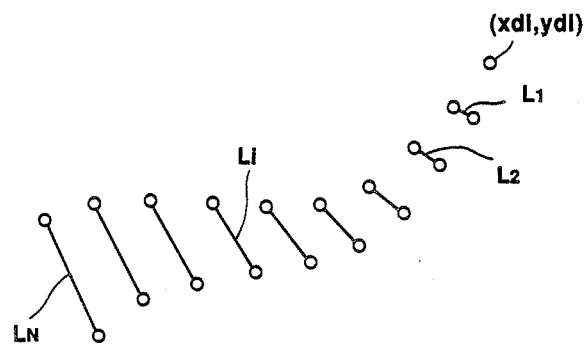
FIG. 25 is an explanatory view for explaining an action of detecting a sum of a residual square of a distance between the locus data and each point on the road which corresponds to the locus data.

FIG. 25 shows the distances between the corresponding point rows denoted by $L_1$, $L_2$, —, $L_i$, —, $L_N$.

Figure 26:
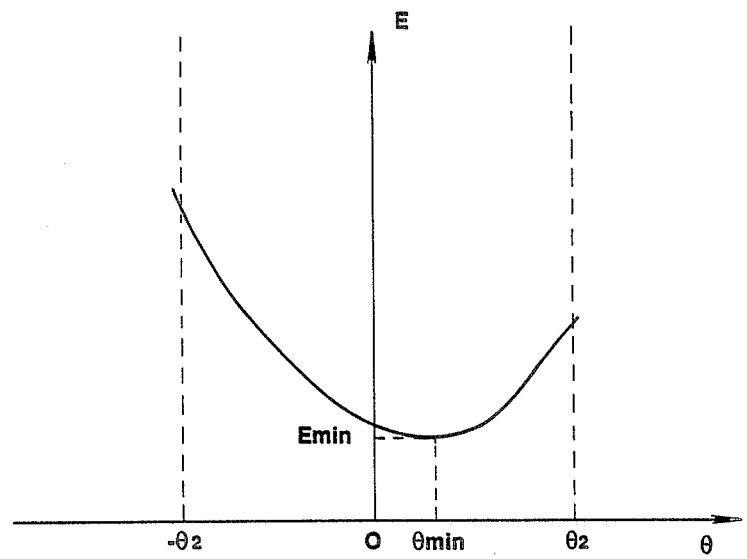
FIG. 26 is an explanatory view for explaining an action of calculating a minimum value Emin of the sum of the residual square.

FIG. 26 shows a graph for explaining the calculation of minimum value $E_{min}$.

As shown in FIG. 26, the minimum value $E_{min}$ is derived at the rotational angle of $\theta_{min}$.

In a step 750, the CPU 1 determines the derived $E_{min}$ as an error value at the promising point of candidate (xdi, ydi).

The series of processings at the steps 700 through 750 are repeated until all points of promising candidate are derived in a step 760.

After the pattern matching processing is carried out in the step 460, the routine returns to the step 470 in which the CPU 1 determines whether one of the points of candidate whose error value is below a threshold value Tl is present. If such a point as described above in the step 470 is present, a processing of a matched point specification in the step 480 is carried out.

Figure 27:
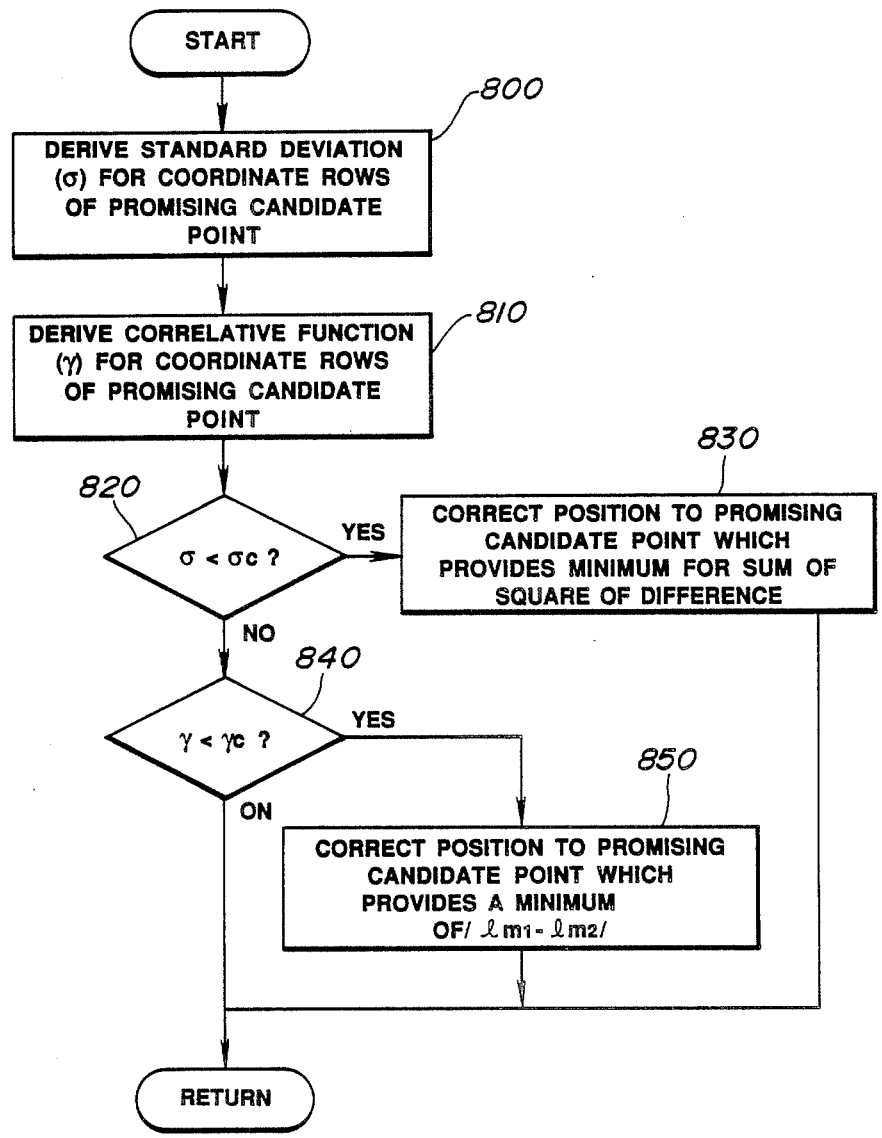
FIG. 27 is a flowchart for explaining a details of a match point particular subroutine in FIG. 9.

FIG. 27 shows a detailed flowchart of processing in the step 480.

Upon start of the program shown in FIG. 27, the routine starts a step 800 in which a standard deviation for the coordinate rows of the promising points of candidates in the following equation.

$$\sigma^2 = \sigma x_2 + \sigma y^2$$
$$= \frac{\sum_{i=1}^{Np}(x_i - \bar{x})^2}{Np} + \frac{\sum_{i=1}^{Np}(y_i - \bar{x})^2}{Np}$$

It is noted that Np denotes the number of coordinate rows of the promising points of candidate, xi denotes the x coordinate of the promising point of candidate in the i order, yi denotes the y coordinate of the promising point of candidate in the i order, $\bar{x}$ denotes an average value of the x coordinate of the promising point of candidate, and $\bar{y}$ denotes an average value of the y coordinate of the promising point of candidate.

In addition, x and y are mutually Independent.

In a step 810, the CPU 1 derives a relative coefficient $\gamma$ for the promising point of candidates using the following equation.

$$\gamma = \frac{\Sigma(x_i - \bar{x})(y_i - \bar{y})}{\sqrt{\Sigma(x_i - \bar{x})^2 \Sigma(y_i - \bar{y})^2}}$$

As described above, when the standard deviation $\sigma$ and relative coefficient $\gamma$ are derived for the coordinate rows of the promising point of candidates, a promising point of candidate which is most suitable for the positional correction is derived from among the promising points of candidates.

The calculation methods for deriving the promising point of candidate which is most suitable for the positional correction will be described below.

(a)

If the standard deviation $\sigma$ is less than a constant value $\sigma_c$ due to small deviations of the promising points of candidates (Yes in a step 820), the present position of the vehicle is corrected so to make the error value Emin become minimum in a step 830.

Figure 28:
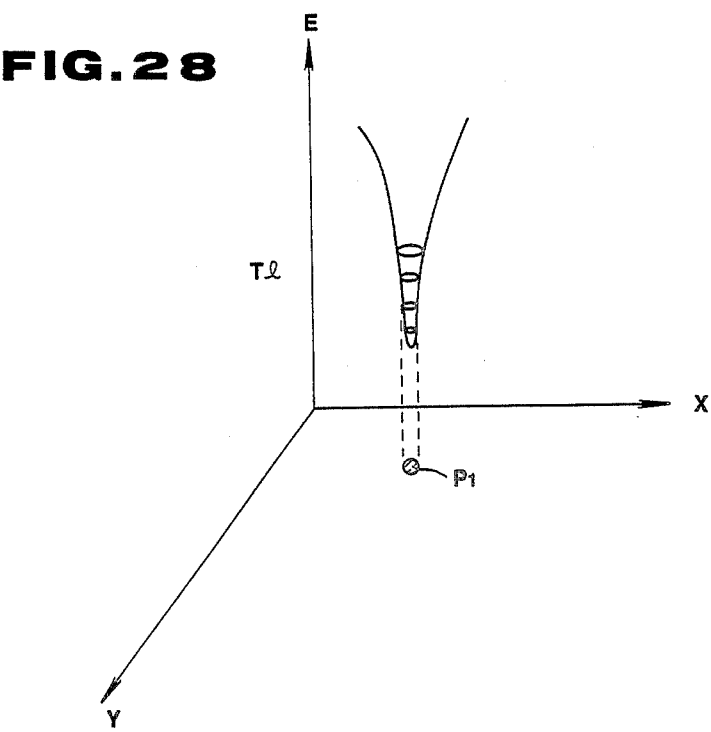
FIG. 28 is an explanatory view for explaining an action in the case where the present position is corrected on the basis of the standard deviation and the correlative coefficient.

This indicates that the point rows of the promising point of candidates are squeezed in a pinhole configuration, as shown in oblique lines in FIG. 28.

(b)

On the other hand, if the standard deviation $\sigma$ is above the constant value $\sigma_c$ and the relative coefficient $\gamma$ is below a constant value $\gamma_c$ (No in the step 820 and Yes in the step 840), the present position is corrected to one promising point of candidate such that an absolute difference of a distance $l_{m1}$ between the previously position corrected point and a distance $l_{m2}$ between the previously position corrected point and the point of promising candidate, i.e., $|l_{m1} - l_{m2}|$ becomes mimimum in a step 850.

Figure 29:
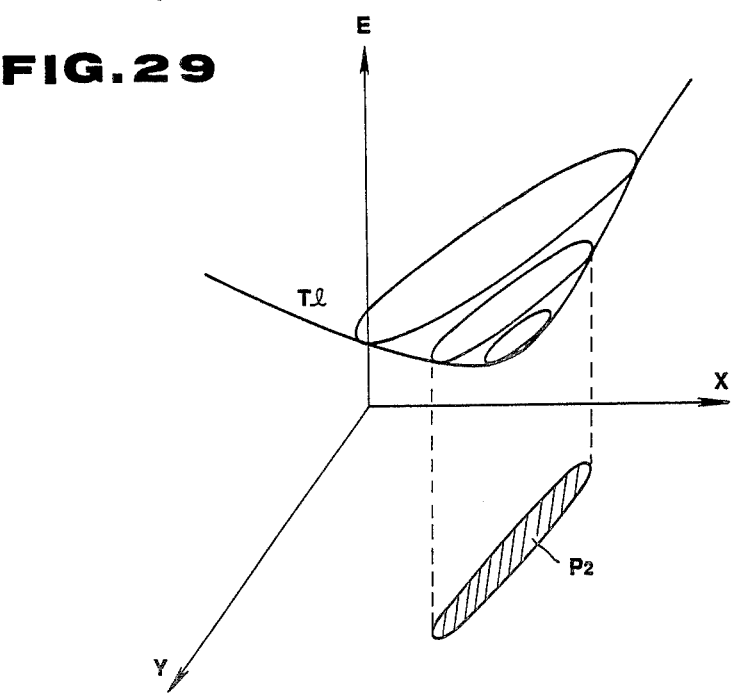
FIG. 29 is an explanatory view for explaining an action in the case where the present position is corrected on the basis of the standard deviation and the correlative coefficient.

This corresponds to a case where the point rows of the promising points of the candidates are arranged as the oblique lines of $P_2$ in FIG. 29 in which the point rows of the promising candidate points are arranged in a substantially straight line, i.e., arranged on a single road. In this case, the present position cannot be specified in the form matching.

Therefore, the present position is corrected with reference to the previously position corrected point.

The above-described cases will occur when the vehicle runs on a straight road, e.g., on a freeway road.

(c)

If both standard deviation $\sigma$ and correlative coefficient $\gamma$ are below the constant values, respectively (No in the step 820 and in the step 840), the specification of the present position is impossible and the position correction is not carried out.

Figure 30:
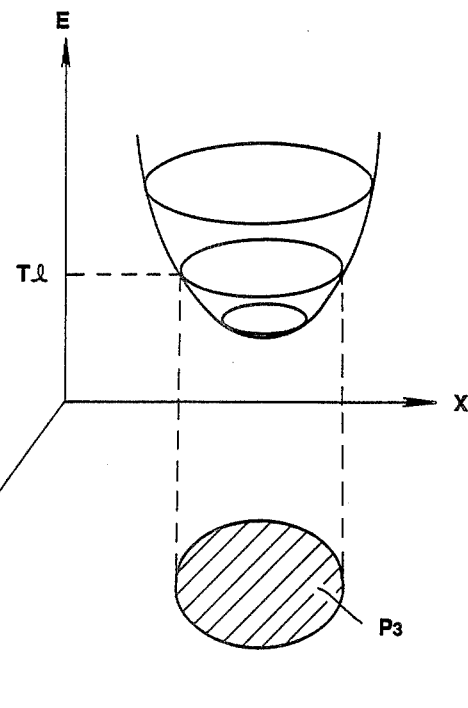
FIG. 30 is an explanatory view for explaining an action in the case where the present position is corrected on the basis of the standard deviation and the correlative coefficient.
Figure 31:
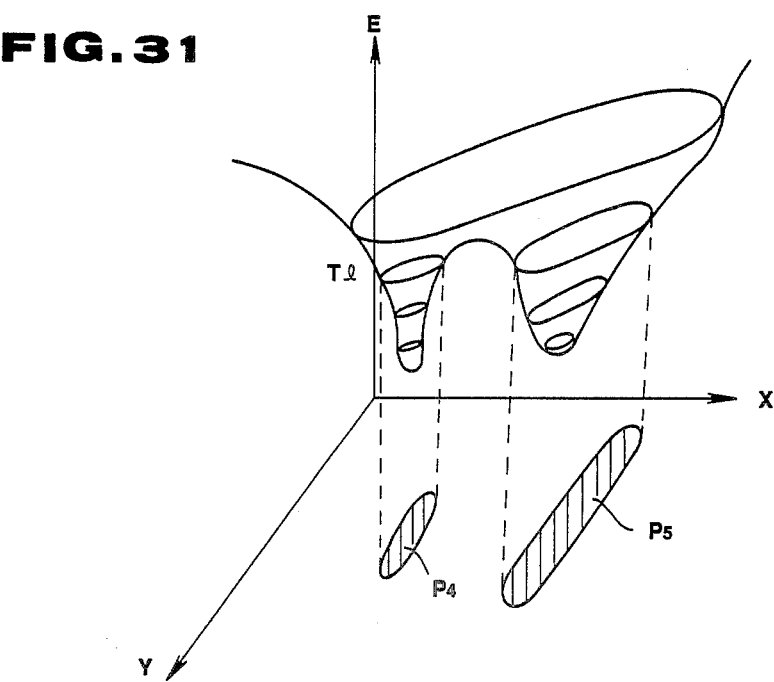
FIG. 31 is an explanatory view for explaining an action in the case where the present position is corrected on the basis of the standard deviation and the correlative coefficient.

This corresponds to cases where the point rows of the promising candidates are widely deviated as denoted by oblique lines of $P_3$ of FIG. 30 and where they are arranged on two straight lines as denoted by oblique lines of $P_4$ and $P_5$ of FIG. 31. In both cases, the present position cannot be specified and the correction of the present position is not carried out.

As described hereinabove, since in the system and method for displaying the present position of the moving object according to the present invention the locus data for each unit distance run is stored and the point of candidate on the present position is spirally searched on any road peripheral to the present position, a prior locus form for each unit distance run on the basis of the locus data stored as described above with the searched point of candidate being as a start point, and the present position of the vehicle (moving object) is specified from the stored locus data and road map pattern matching, the present position can accurately be detected without failure even though the moving object has run for a long duration of time.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for displaying a present position of a moving object, comprising:
    (a) first means for detecting a running distance of the moving object;
    (b) second means for detecting a running direction of the moving object;
    (c) third means for initially setting the present position of the moving object;
    (d) fourth means for deriving movement components in a horizontal direction per unit run distance and in a vertical direction per unit run distance when the moving object has moved on the basis of the unit run distance and running direction of the moving object derived from the first and second means;
    (e) fifth means for accumulating respective movement components derived by the fourth means with an initially set position of the moving object derived by the third means as a start point to derive the present position of the moving object;
    (f) sixth means for storing a locus data having the respective movement components in the horizontal and vertical directions per unit run distance derived by the fourth means;
    (g) seventh means for storing a road map information;
    (h) eighth means for selecting a road map information peripheral to the present position from the stored road map information of the seventh means;
    (i) ninth means for storing a display information to superpose and display the present position of the moving object on the road map information selected by the eighth means;
    (j) tenth means for displaying the contents of the ninth means on a screen thereof;
    (k) eleventh means for executing a pattern recognition between a road form based on the road map and a running locus form of the moving object based on the locus data; and
    (l) twelfth means for automatically correcting the present position of the moving object when a degree of coincidence between both patterns of the road form and locus form are relatively high.

2. A system as set forth in claim 1, wherein the eleventh means selects the locus form to be subjected to the pattern recognition in such a way that minor totals of the movement components stored in the sixth means for each unit distance ($\Delta l_1$) are discretely selected whenever at least one of the movement components in the horizontal and vertical directions exceeds another unit run direction ($\Delta l_2 : \Delta l_2 > \Delta l_1$).

3. A system as set forth in claim 2, wherein the ninth means includes a V-RAM (Video Random Access Memory) in which the road form is depicted and wherein the eleventh means selects an end point of the road form to be subjected to the pattern recognition in such a way as to search in a spiral form a block with the present position of the moving object when a coordinate transform is executed on the V-RAM in which the road form is depicted.

4. A system as set forth in claim 3, wherein the eleventh means changes stepwise a width of an area (matching area) in which the block is spirally searched through a function having parameters of a running distance from a previously position corrected present position, the degree of coincidence when the pattern recognition is previously executed, and a probability density of the previously position corrected present position.

5. A system as set forth in claim 4, wherein the eleventh means deletes one of the two selected road points whose mutual distance is below a predetermined value $l_3$ ($\Delta l_1 < l_3 < \Delta l_2$) and sorts the respective road points in an order such that a road point which is nearest to the present position is the first.

6. A system as set forth in claim 5, wherein the eleventh means superposes and relax the discrete locus data in an order from a road point derived in the claim 5 with a predetermined allowance value so as to extract the corresponding point of road.

7. A system as set forth in claim 6, wherein when all prescribed numbers (N) of points from the present position correspond to the points of road, the eleventh means determines an end point of the road as a point of candidate for the correction of the present position.

8. A system as set forth in claim 7, wherein when the points which do not correspond to the locus data and road data are n number (n<N), the eleventh means determines an end point of the road as the point of candidate for the correction of the present position.

9. A system as set forth in claim 8, wherein the eleventh means calculates a sum of residual square (E) from the road data on the point of candidate and the corresponding locus data before subjected to the relaxation, determines whether E is below Tl (threshold), and determines the end point of the road as being a promising point of candidate.

10. A system as set forth in claim 9, wherein the eleventh means rotates the locus data with the present position as a center through each unit angle ($\Delta\theta_i$), derives a minimum value (Emin) of a sum of residual square for each rotation angle, determines whether Emin is below the threshold (Tl), and determines the rotated locus data as the promising point of candidate when this value Emin is below the threshold and determines this value Emin as the degree of coincidence at the promising point of candidate.

11. A system as set forth in claim 10, the angle of rotation of the locus data is within the allowance limit value ($\pm\Delta\theta_2$).

12. A system as set forth in claim 11, wherein the twelfth means includes:
    (a) thirteenth means for deriving a standard deviation ($\sigma$) and correlative coefficient $\gamma$ on the basis of a set of the promising points of candidates;
    (b) fourteenth means for correcting the present position to one promising point of candidate which provides a minimum of the sum of residual square (E) when the standard deviation ($\sigma$) is below a constant ($\sigma_c$);
    (c) fifteenth means for correcting the present position to one promising point of candidate in which an absolute value ($l_m = |l_{m1} - l_{m2}|$) of a difference between a distance ($l_{m1}$) from the previously corrected position to the present position of the vehicle and a distance from the previously corrected position to the promising point of candidate ($l_{m2}$) becomes minimum when the standard deviation is equal to or above the constant ($\sigma \geq \sigma_c$) and correlative coefficient $\gamma > \gamma_c$ (constant); and
    (d) sixteenth means for inhibiting the correction of the present position when either $\sigma \geq \sigma_c$ and $\gamma \leq \gamma_c$, or $\sigma < \sigma_c$ and $\gamma > \gamma_c$.

13. A system as set forth in claim 1, which further comprises thirteenth means for manually correcting the present position of the vehicle when the present position is placed on a position except the road map information.

14. A system for displaying a present position of a moving object, comprising:
    (a) first means for detecting a running distance of the moving object;
    (b) second means for detecting a running direction of the moving object;
    (c) third means for initially setting the present position of the moving object;
    (d) fourth means for deriving movement components in a horizontal direction per unit run distance and in a vertical direction per unit run distance when the moving object has moved on the basis of the unit run distance and running direction of the moving object derived from the first and second means;
    (e) fifth means for accumulating respective movement components derived by the fourth means with an initially set position of the moving object derived by the third means as a start point to derive the present position of the moving object;
    (f) sixth means for storing a locus data having the respective movement components in the horizontal and vertical directions per unit run distance derived by the fourth means;
    (g) seventh means for storing a road map information;
    (h) eighth means for selecting a road map information peripheral to the present position from the stored road map information of the seventh means;
    (i) ninth means for storing a display information to superpose and display the present position of the moving object on the road map information selected by the eighth means;
    (j) tenth means for displaying the contents of the ninth means on a screen thereof;
    (k) eleventh means for executing a pattern recognition between a road form based on the road map and a running locus form of the moving object based on the locus data; and
    (l) twelfth means for automatically correcting the present position of the moving object according to a result of the pattern recognition executed by the eleventh means.

15. A system as set forth in claim 14, wherein the third means comprises a series of keys on a keyboard for inputting an initial position of the moving object as the present position of the vehicle.

16. A system as set forth in claim 14, wherein the sixth means derives and stores a required number of minor totals of the movement components in the horizontal and vertical directions with respect to the road map information displayed on the tenth means as the locus data of the moving object when the movement components of the moving object in either the horizontal or vertical direction exceeds another unit of run distance.

17. A system as set forth in claim 16, wherein the eighth means comprises: (a) thirteenth means for searching spirally points of candidate for the present position of the moving object on any one of roads peripheral to the present position of the moving object; (b) fourteenth means for deleting at least one of the two points of candidate which are placed on a peripheral road and whose mutual interval distance is too short; (c) fifteenth means for sorting the points of candidate in an order such that one of the points of candidate for the present position which is nearest to the present position is the first; and (d) sixteenth means for overlapping the locus data on the road form for each point of candidate and selecting one point of candidate at which the overlapping can be achieved through a relaxation method within an allowance limit as one promising point of candidate.

18. A systemm as set forth in claim 17, wherein the eleventh means carries out a rotation of the locus with the promising point of candidate as a center, derives an error value between each promising candidate and a corresponding point on the peripheral road, and determines whether one of each promising point of candidate which provides the error value which is below a threshold is present.

19. A system as set forth in claim 18, wherein the eleventh means calculates a standard deviation and correlative coefficient of the promising point of candidate which provides the error value which is below the threshold and wherein the twelfth means corrects the present position of the vehicle on the basis of the result of the calculation of the standard deviation and correlative coefficient by the eleventh means.

20. A system as set forth in claim 14, wherein the seventh means comprises a CD (Comapct Disc) - ROM.

21. A system as set forth in claim 14, wherein the ninth means comprises a V-RAM.

22. A method for displaying a present position of a moving object, comprising the steps of:
  (a) detecting a running distance of the moving object;
  (b) detecting a running direction of the moving object;
  (c) setting an initial present position of the moving object;
  (d) deriving movement components in a horizontal direction per unit run distance and in a vertical direction per unit run distance when the moving object has moved on the basis of the unit run distance and running direction of the moving object derived in the steps (a) and (b);
  (e) accumulating respective movement components derived in the step (d) with an initially set position of the moving object derived in the step (c) as a start point to derive the present position of the moving object;
  (f) storing a locus data having the respective movement components in the horizontal and vertical directions per unit run distance derived in the step (d);
  (g) storing a road map information;
  (h) selecting a road map information peripheral to the present position from the stored road map information;
  (i) storing a display information to superpose and display the present position of the moving object on the road map information selected in the step (h);
  (j) displaying the stored contents in the step (i) on a screen thereof;
  (k) executing a pattern recognition between a road form based on the road map and a running locus form of the moving object based on the locus data; and
  (l) automatically correcting the present position of the moving object according to a result of the pattern recognition executed the step (k).

* * * * *